United States Patent
Wang

(10) Patent No.: US 7,555,674 B1
(45) Date of Patent: Jun. 30, 2009

(54) REPLICATION MACHINE AND METHOD OF DISASTER RECOVERY FOR COMPUTERS

(76) Inventor: Chuan Wang, 2 Kitson Park Dr., Lexington, MA (US) 02421

( * ) Notice: Subject to any disclaimer, the term of this patent is extended or adjusted under 35 U.S.C. 154(b) by 860 days.

(21) Appl. No.: 10/939,231

(22) Filed: Sep. 9, 2004

Related U.S. Application Data

(60) Provisional application No. 60/502,058, filed on Sep. 11, 2003.

(51) Int. Cl.
*G06F 11/00* (2006.01)
(52) U.S. Cl. .......................... 714/15; 714/12
(58) Field of Classification Search ............... 714/2–3, 714/5, 7, 12–13, 15, 42, 54
See application file for complete search history.

(56) References Cited

U.S. PATENT DOCUMENTS

| | | | |
|---|---|---|---|
| 5,133,065 A | 7/1992 | Cheffetz | |
| 5,142,680 A | 8/1992 | Ottman | |
| 5,212,772 A | 5/1993 | Masters | |
| 5,469,573 A | 11/1995 | McGill | |
| 5,799,147 A | 8/1998 | Shannon | |
| 5,842,024 A | 11/1998 | Choye | |
| 6,080,207 A | 6/2000 | Kroening | |
| 6,131,141 A | 10/2000 | Ravid | |
| 6,179,492 B1 | 1/2001 | Guy | |
| 6,317,845 B1 | 11/2001 | Meyer | |
| 6,591,376 B1 * | 7/2003 | VanRooven et al. | 714/36 |
| 6,594,743 B1 * | 7/2003 | Chen et al. | 711/162 |
| 6,802,029 B2 * | 10/2004 | Shen et al. | 714/38 |
| 6,952,794 B2 * | 10/2005 | Lu | 714/7 |
| 6,996,287 B1 * | 2/2006 | Weiss | 382/260 |
| 7,024,528 B2 * | 4/2006 | LeCrone et al. | 711/162 |
| 7,024,581 B1 * | 4/2006 | Wang et al. | 714/2 |
| 7,313,726 B2 * | 12/2007 | Shen et al. | 714/15 |
| 7,434,100 B2 * | 10/2008 | Hogdal et al. | 714/27 |
| 2002/0124245 A1 | 9/2002 | Maddux | |
| 2004/0172578 A1 * | 9/2004 | Chen et al. | 714/15 |
| 2007/0157178 A1 * | 7/2007 | Kogan et al. | 717/130 |

OTHER PUBLICATIONS

Preston, W. Curtis; "UNIX Backup and Recovery", O'Reilly, 1999.
McMains, John R. and Chronister, Bob; "NT Backup and Recovery", Osborne/McGraw-Hill, 1998.
Legato Systems, Inc.; "Legato NetWorker Recovery Manager for UNIX Administrator's Guide", Legato Systems, Inc., Apr. 2002.
Brooks, Charlotte, et al.; "Disaster Recovery Strategies with Tivoli Storage Management", IBM Redbook, Nov. 2002.
Veritas Software: "VERITAS Bare Metal Restore 4.6 for VERITAS NetBackup, Systems Administrator's Guide for UNIX and Windows", Veritas Software, 2003.

(Continued)

*Primary Examiner*—Dieu-Minh Le

(57) ABSTRACT

A computer replication and/or recovery system and process comprising a recovery machine which rebuilds operating system ("OS") disks for damaged computers from their backup images. The recovery processes are performed within the recovery machine, which is a separate machine from both the damaged and replacement machines. Rebuilt OS disks are then adapted to the replacement computers with different hardware. The recovery method of the present invention is a network independent solution.

7 Claims, 4 Drawing Sheets

OTHER PUBLICATIONS

Symantec Corporation; "Norton Ghost User's Guide", Symantec Corporation, 2002.
Hewlett-Packard Development Company: "Ignite-UX Administration Guide", Hewlett-Packard Development Company, 2007.
Sun Microsystems, Inc.: "Solaris 9 9/04 Installation Guide", Sun Microsystems, Inc., 2004.
Hewlett-Packard Development Company: "Ignite-UX Installation Booting", Hewlett-Packard Development Company, 2007.
IBM Corporation: "AIX 5L Version 5.3 Installation Guide and Reference", IBM Corporation, 2004.

* cited by examiner

REPLICATION MACHINE AND METHOD OF DISASTER RECOVERY FOR COMPUTERS

CROSS-REFERENCE TO RELATED APPLICATIONS

This application claims the benefit of U.S. Provisional Patent Application Ser. No. 60/502,058, filed 11 Sep. 2003, the contents of which are hereby incorporated by reference herein.

FIELD OF THE INVENTION

This invention relates generally to computer systems, and more specifically to restoring the operability of large numbers of computers that have been rendered inoperable.

BACKGROUND OF THE INVENTION

Every organization desires an ability to quickly restore its business operations from a disaster that causes complete computer system failure and to minimize the disruption to its business in case of a system failure. Such needs have become particularly urgent after the attacks on the World Trade Center in New York City, New York on Sep. 11, 2001, during which many computer systems were destroyed and were out of service for extended periods of time. Many financial transactions were also lost as a result of this disaster. U.S. financial markets were closed for four (4) days until limited computer systems and business operations could be restored. Clearly, the information technology industry is in need of better methods for disaster recovery.

A. Operating System

Every computer requires system software to control and manage its operation. System software and data, often known collectively as operating system ("OS"), are essential and basic software components. It is common practice in a large enterprise environment, to save the operating system and data on a separate disk, known as the OS disk, system disk, or root disk. The OS disk is the most vulnerable and critical component of an enterprise-class computer system.

Many operating systems are compliant with a software industry standard often known as the application binary interface ("ABI"). ABI compliant operating system products are usually distributed as software modules. Each software module can be installed or removed with standard system management utilities. For each business machine, the OS is often uniquely customized. As a result, the actual system data of each business system is unique with respect to its business operation, its hardware components, and whatever software packages have been installed. If two computers are identical, their OS disk image must be identical. Therefore, restoring system software and data is always the first and the key step of any computer recovery procedure.

B. Recovery Methods

In the prior art, recovery methods are parallel to the conventional ways that the OS was originally installed. Typically, OS installation is initially performed within the original computer itself. Usually, it temporarily starts with an OS installation tool, either locally or remotely, and then copies the OS software from the installation media to its own permanent disk. Similarly, recovery processes with all prior methods are implemented within the replacement computer. The replacement computer copies the system backup image from the backup source, either locally from its own backup device or remotely from shared backup devices on the server, to its own permanent OS disk.

OS installation tools typically utilize CD-ROM, DVD, tape, or floppy disks that are often directly attached to the computer in which they are to be installed. OS installation tools are often provided by computer or OS manufacturers. Many manufacturers also provide enterprise software tools for a large scale system installation. Examples of this type of solution include Network Installation Management™ (NIM) from IBM for their AIX™, Ignite-UX™ from Hewlett-Packard for their HP-UX™, JumpStart™ from Sun Microsystems for their Solaris™, and KickStart™ for RedHat™ Linux™. OS installation tools have been widely used in system recovery.

Conventionally, a system recovery is done by (a) starting up the replacement computer from an OS installation tool, (b) reinstalling the OS, (c) updating the OS when necessary to match the original system, (d) reinstalling the backup software, and (e) then restoring files that have been customized and modified. This reinstall-then-restore approach is often error-prone and time-consuming. In practice, a direct restore approach is more desirable.

(1) Local Methods and Drawbacks

Computer manufacturers usually provide a variety of backup and recovery utilities associated with their operating systems. These native backup recovery utilities provide simple and basic tools to allow people having skills in the field to perform backup and recovery operations. If a computer is damaged and its replacement is equipped with a backup device, the replacement computer can be simply rebuilt from the backup image in its directly attached backup device. Methods of this type are often known as local methods. A local method is a simple and widely used recovery method by those skilled in the field, and works well for a small environment. However, local methods pose various problems for a large corporate data center. Local methods poorly utilize backup hardware resources because they require that every computer be equipped with its own backup device. Furthermore, because they require a large number of individual backup devices, they are very difficult to manage. Examples of native backup recovery utilities include "dd", "dump", and "restore" among variants of UNIX operating systems, and "XCOPY" and "NTBACKUP" among variants of Microsoft Windows operating systems. Examples of proprietary products of this type include "mksysb" of the IBM AIX operating system and "make_recovery" and "btcreate" of the Hewlett-Packard HP-UX operating system and the Tru64 operating system, and Symantec Norton Ghost for Windows operating systems.

(2) Improved Networked Methods

Networked methods overcome many of the drawbacks of local methods. Networked methods allow backup hardware to be shared and also allow the backup and recovery operation to be centrally managed.

Networked methods are client-server solutions. A recovery server centrally controls and manages backup and restore operations for other computers to be protected. Networked methods utilize computer networks and networking protocols, typically a TCP/IP protocol set. TCP stands for Transmission Control Protocol, and IP for Internet Protocol. TCP/IP is typically implemented in each computer to allow data communication among computers in a computer network.

In case of a failed OS disk, special preparation is required for a recovery process by networked methods. In order to access a recovery image located in the centralized backup storage, a fresh replacement computer needs to start up with not only a basic operating system, but also with a proper networking connection and configuration, and the networked recovery utility. This is because the recovery image is located in the centralized backup storage on the server computer. Furthermore, the replacement computer also requires a proper security permission to be set to communicate with the server computers. The OS disk can be then rebuilt by copying the recovery image from the server over a network.

It is not uncommon for a large data center to be equipped with thousands of business computers. Each system is typically equipped with several gigabytes of system software and data. If only a few computers are required for recovery, recovery speed may be not an issue since it is usually determined by the bandwidth of the network. However, for a mass recovery operation, thousands of recovery client computers flood a large amount of data requests and put too mush CPU load on the server to handle. In the case of a mass recovery operation, TCP/IP becomes a serious performance bottleneck for networked methods, in addition to the problem of limited network bandwidth. This is because networked solutions rely on TCP/IP to accomplish data transfer from the server to its recovery clients. TCP/IP is not efficient in design to handle such a large amount of data transfer.

Examples of networked products for system recovery include NetWorker Recovery Manager™ from EMC Corp, and Tivoli Disaster Recovery Manager™ and Network Installation Management™ from IBM, Bare Metal Restore™ from Veritas Software, and Ghost Corporate Edition™ from Symantec. Examples of networked backup recovery methods also include U.S. Pat. Nos. 5,212,772; 5,133,065; and 5,799, 147.

As noted above, local methods all suffer from the drawbacks of manageability and hardware inefficiency. On the other hand, networked methods overcome these drawbacks by utilizing TCP/IP and computer networks. However, TCP/IP and computer networks become serious limiting factors to prevent effective mass recovery operation in the case of a major disaster. Especially after Sep. 11, 2001, same day recovery and no data loss have become business requirements. It is urgent to develop more effective and quicker methods for computer system disaster recovery.

BRIEF SUMMARY OF THE INVENTION

Accordingly, the main object of the present invention is to fulfill the urgent need for an effective technique to rapidly rebuild a large number of computers with minimal data loss in the case of a major disaster. The invention provides a computer recovery system (known as the "Replication Machine") and a method (known as "System Replication") to allow a mass restoration to be centrally performed from a distant site much faster than was heretofore possible.

One important advantage of the invention is that this recovery method is a network independent solution. With this invention, the majority of data recovery is accomplished within a replication machine instead of within a replacement computer as with prior technologies. The data recovery path is within the replication machine instead of between a recovery server and a replacement computer as is done with prior network methods. This recovery method eliminates the need of the TCP/IP network and the TCP/IP itself which that are significant limiting factors in being able to quickly restore a large number of failed computers. With the ability to centrally manage recovery operations, the recovery procedure of the present invention is significantly simplified. The required recovery time is also significantly reduced. Furthermore, by eliminating network dependency, the reliability of the recovery method is significantly increased. In contrast, many prior technologies, such as the networked methods currently in use, rely on computer network and networking protocols. With a networked method, recovered data are transferred through a network between a recovery server and a replacement computer.

Another advantage of the invention is that the replication machine is designed to be able to quickly replicate recovery images from a distant site and thus minimize data loss. It is desirable that a recovery site to be located several hundreds of miles away from the primary data center. The ability of instant data replication and greater remoteness of recovery sites significantly increase disaster tolerance. Instant data replication allows a failed system to be restored to the point-in-time of failure.

Yet another advantage of the invention is that more than one independent replication machine can be implemented in each site. The installation of multiple replication machines provides redundancy for backup recovery in the event a replication machine should fail. Recovery performance bottlenecks and recovery single-point-of failures are thus significantly reduced. As a result, dependencies on servers and networks are eliminated, which significantly increases the reliability of the disaster recovery method of the present invention. In contrast, networked methods are client-server solutions. Many networked methods require three or more servers together to perform a recovery operation. In case a problem is encountered by any server, the recovery process will be interrupted. Therefore, networked methods are prone to multiple points of failure.

To achieve the above performance features, the present invention provides a computer replication machine and replication method (of operation thereof), which allows a large number of damaged computers to be restored in significantly reduced time compared with prior technologies. The replication machine generally comprises (1) a computer system that centrally controls and manages replication operations, (2) a shared storage system that maintains recovery images and provides a means to quickly replicate recovery images at a distant recovery site, and (3) a disk subsystem that accommodates disks so that mass disk restoration can be performed within the replication machine for a large number of replacement computers. Multiple replication machines can be implemented at each distant site. The replication method utilizes the replication machine to rebuild OS disks for damaged computers from their backup images. Such replication processes are performed within the replication machine instead of within the replacement computer itself as taught in the prior art. Unlike the prior art, the replication machine is a separate machine from both the existing and new machines. Replicated OS disks can be modified to adapt to replacement computers with different hardware. The replication method of the present invention is a network independent solution.

The present invention provides an efficient method and machine for computer replication and for computer disaster recovery. Compared with prior technologies, it delivers superior performance.

Further advantages of the present invention will become apparent from a consideration of the attached drawings and ensuing description. It is to be understood that the present invention may be embodied in various forms. Therefore, both the general description above and the detailed description below are exemplary but not restrictive of the invention as claimed. The drawings, together with the detailed descriptions, illustrate a number of embodiments which serve to explain the general principles of the present invention, and to teach those skilled in the field to employ the present invention in virtually any appropriately detailed system, structure or manner.

DETAILED DESCRIPTION OF THE INVENTION

Computer replication is a process to reproduce a computer with identical business functions as the original. This invention provides a novel computer replication method to quickly reproduce a computer with replacement hardware via rebuilding the OS disk after a catastrophic failure.

Figure 1:
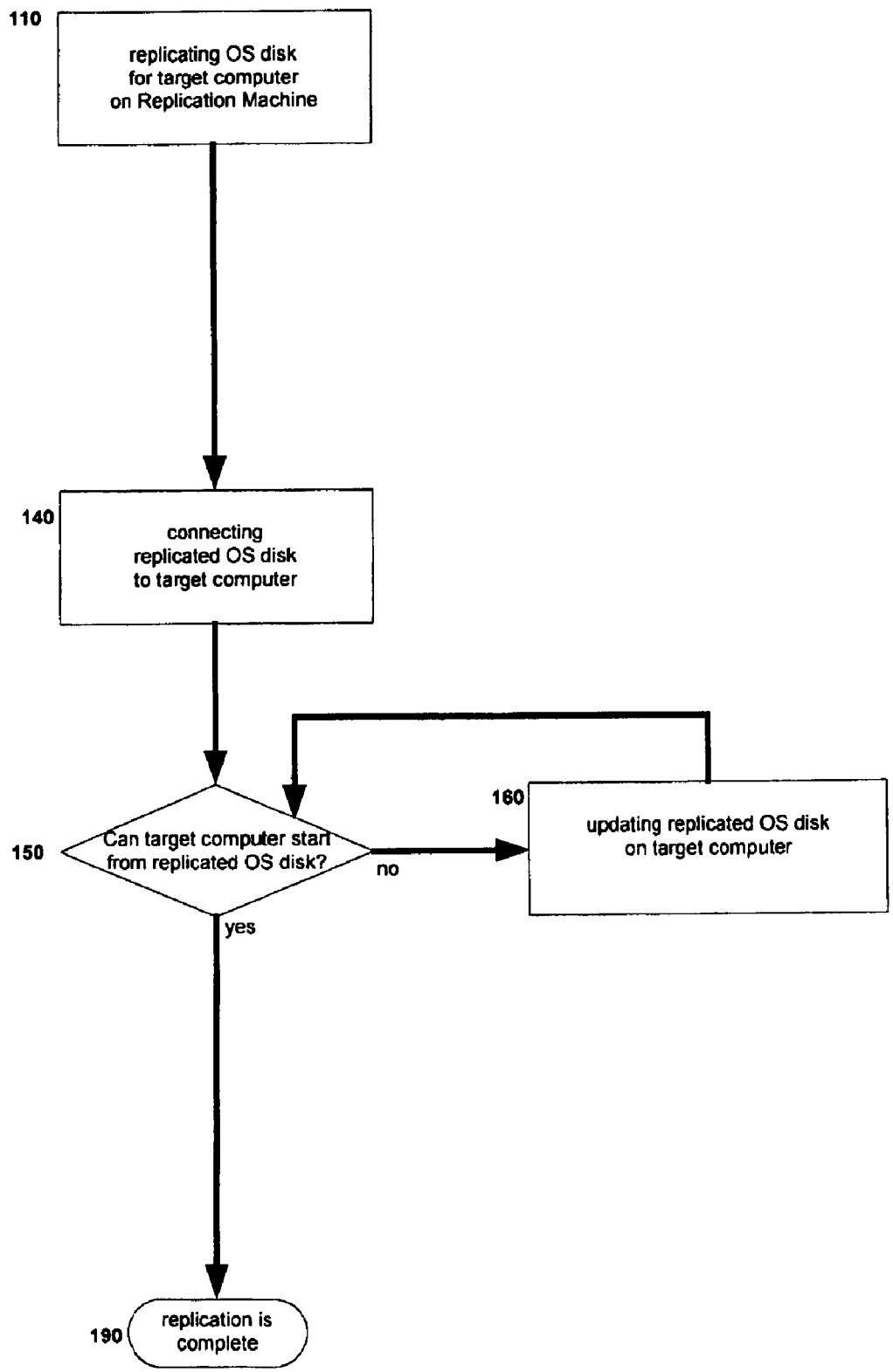
FIG. 1 is a flow diagram of a method that implements the present invention.

FIG. 1 illustrates a basic method which implements the present invention. First, the OS disk for the target computer is replicated on the Replication Machine 8 as shown in Step 110. Next, the replicated OS disk 11' is connected to the target computer 10 as shown in Step 140. The target computer is then tested to see if it can start from the replicated OS disk 11' as shown in Step 150; if the target computer 10 cannot start from the replicated OS disk 11', operator needs to start the target computer 10 utilizing OS installation media, and then updates the device driver files and data on the replicated OS disk 11' as shown in Step 160, until the target computer can be started from the replicated OS disk 11' as shown in Step 150. Thus, the recovery is complete as shown in Step 190.

Figure 2:
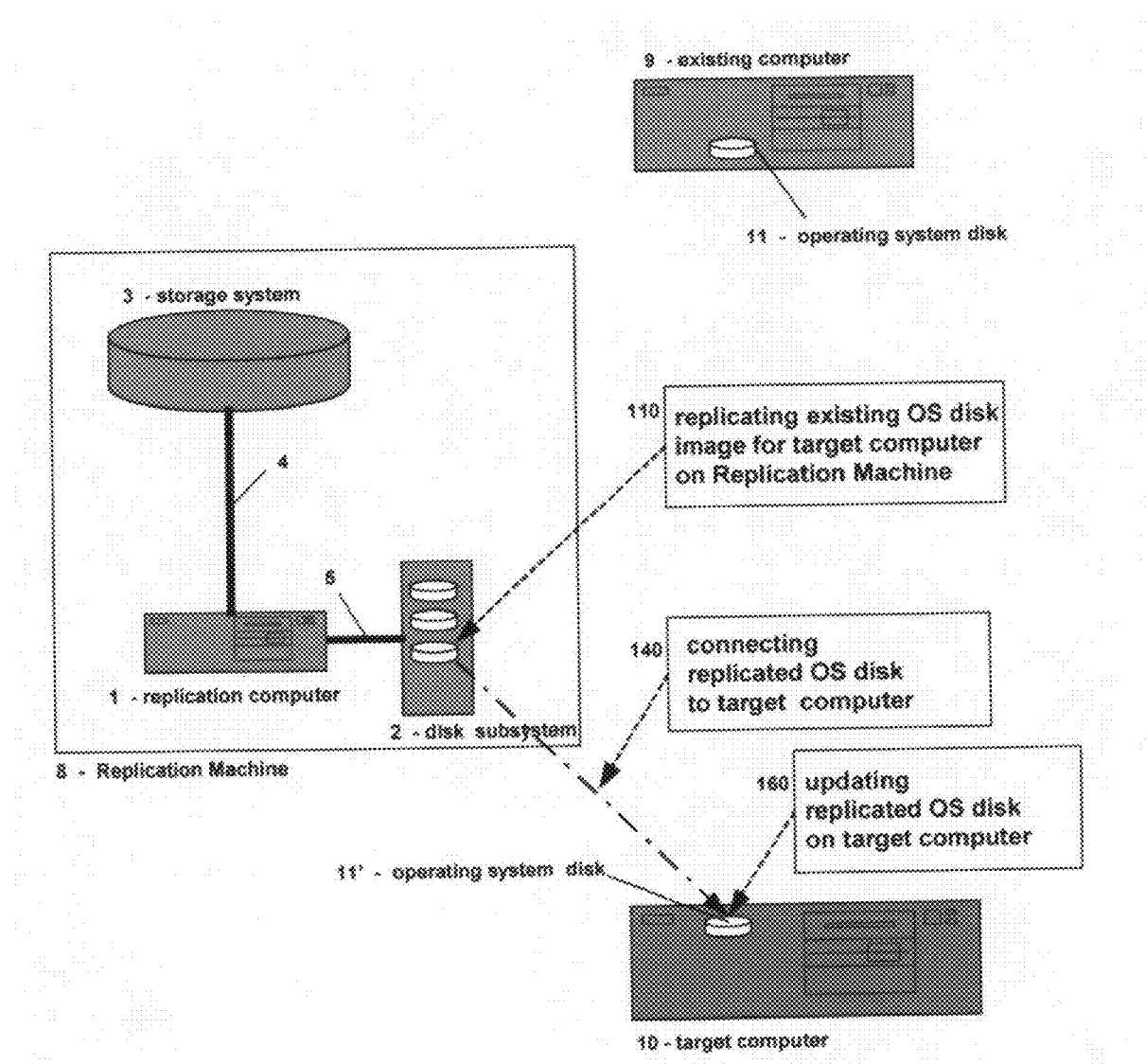
FIG. 2 is a schematic diagram of a basic version of a replication machine that implements the present invention.

FIG. 2 illustrates a basic version of a replication machine that implements the present invention. The replication machine generally comprises: (a) a replication computer 1; (b) a disk subsystem 2; and (c) a storage system 3. Connections 4 and 5 link the replication computer 1 with the disk subsystem 2 and the storage system 3, respectively.

The replication computer 1 is used to centrally manage the recovery operation, including the manipulation of the OS disk and file-system. The operating system of the replication computer 1 can be a UNIX or Microsoft Windows variant.

The disk subsystem 2 is used to accommodate OS disks for (target) computers to be reproduced. It can be either a set of internal disks or an external disk subsystem connected to the replication computer 1. The disks must be compatible with the (target) computer to be restored and be able to serve as its OS disk.

The storage system 3 is used to manage OS disk images for computers to be replicated. It can be either internal disks or an external storage system. The external storage can be either disk or tape systems, or other backup media devices. The choice of the storage system is often determined by the tradeoff between cost and performance. High-end storage systems of Redundant Array of Independent Disks ("RAID") often provide the ability of instantly replicating backup images at a remote backup data center site. Instant data replication reduces possible data loss in case of disaster.

Connections 4 and 5 can be as simple as cable connection, typically Small-Computer-System-Interface ("SCSI") of Fiber-Channel ("FC") type depending on the actual hardware in use.

Figure 3:
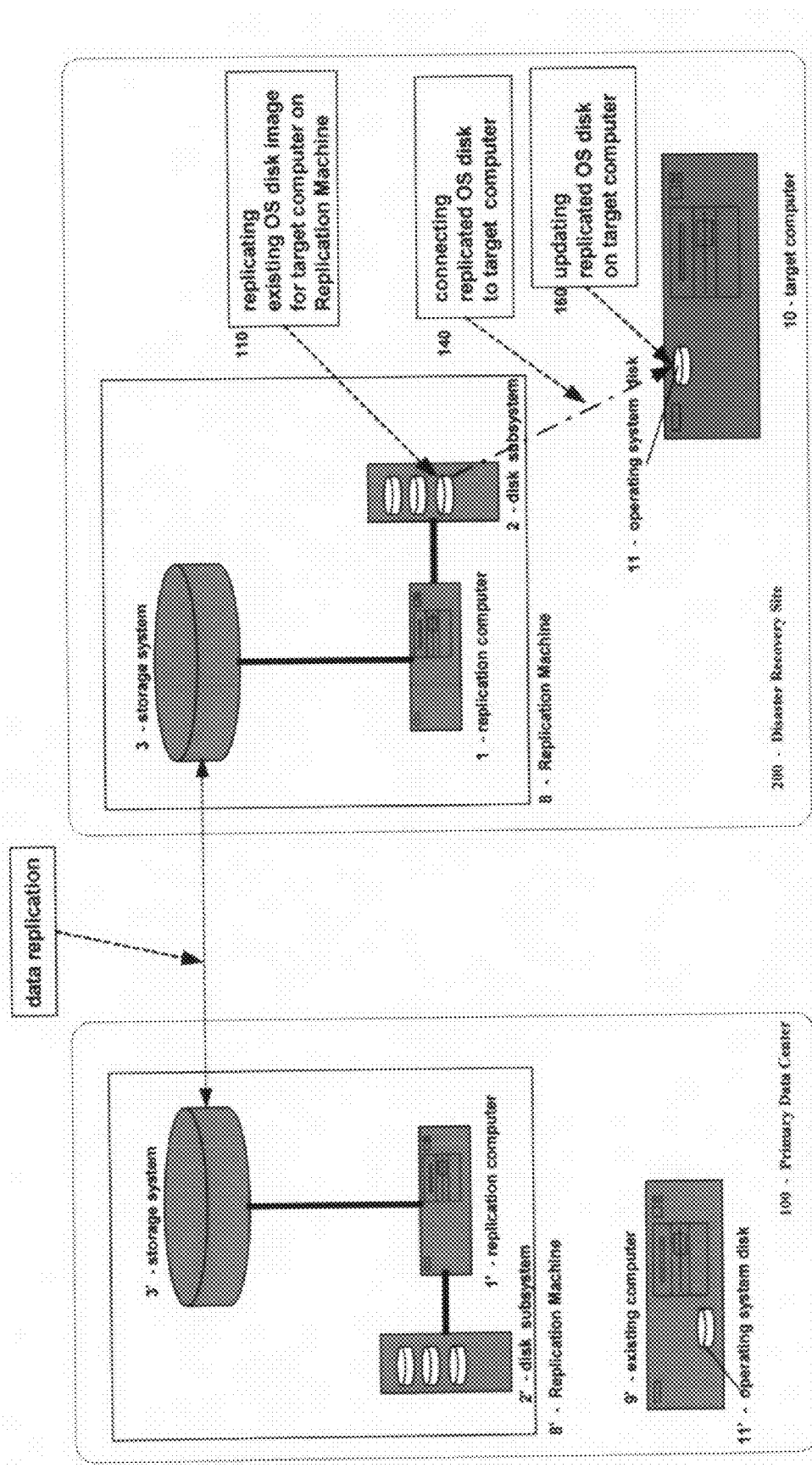
FIG. 3 is a schematic diagram of two replication machines that are implemented in separated data centers.

FIG. 3 illustrates another alternate of the preferred hardware configuration. Two Replication Machines can be implemented in physically separated data centers without distance limitation. This type of configuration can provide additional protection, owing to the unlimited distance separating the machines, against catastrophic system failure, in case of wars, natural disasters and other unforeseeable regional events. Data replication or electronic data vaulting can be implemented.

Figure 4:
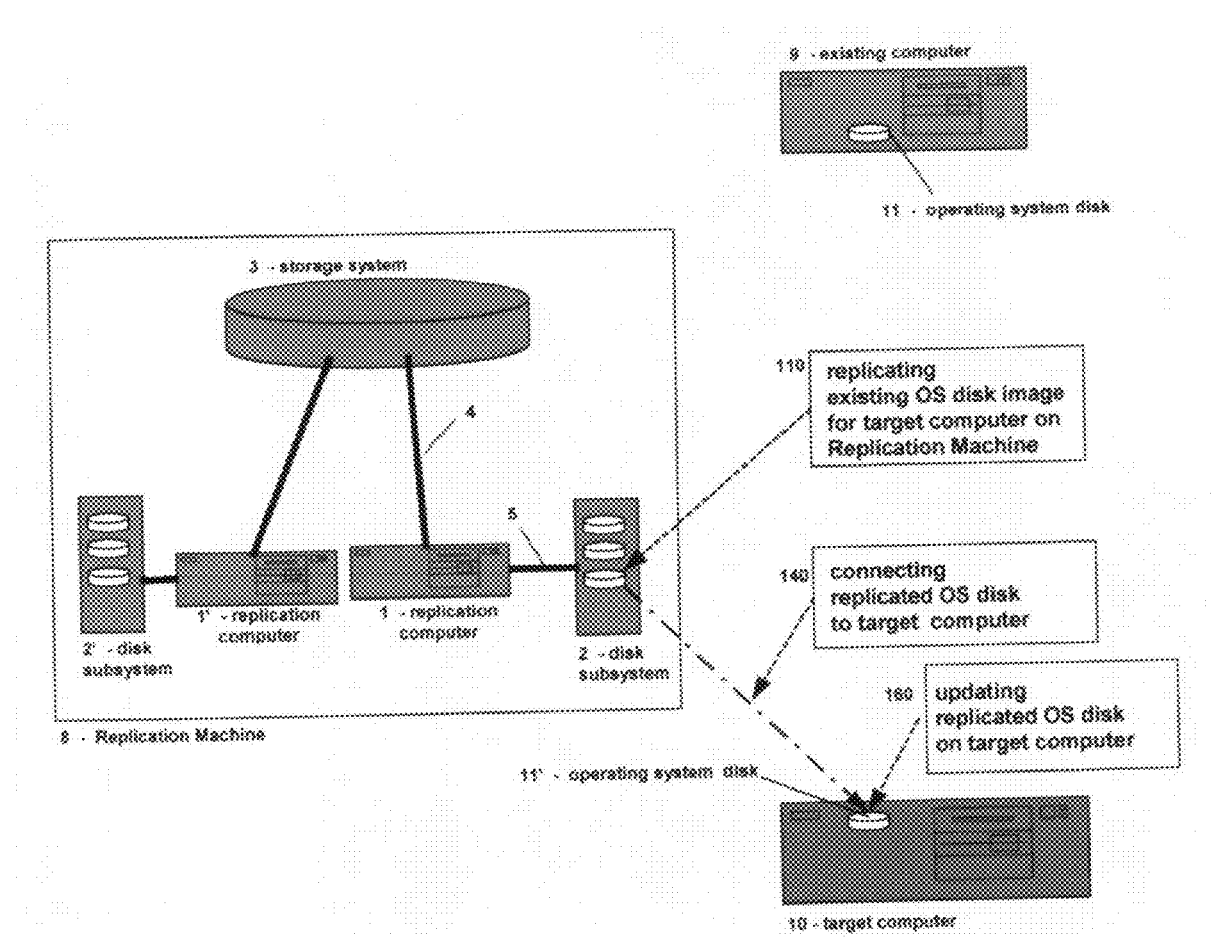
FIG. 4 is a schematic diagram of two replication machines that share a single storage system in the same data center.

FIG. 4 illustrates another alternate of the Replication Machines configuration, in which two Replication Machines can be implemented with a shared storage system 3 in the same data center. This configuration not only provides improved performance and capacity, but also minimizes possible single point of failure in a disaster recovery operation.

Those of ordinary skill in the art will appreciate that the present invention, including each of the hardware configurations shown in FIGS. 1-5, inclusive, and/or each of the hardware components of each configuration, may be embodied in various forms. Implementation may vary depending on the tradeoff between cost and performance, and other considerations. In practice, it is sometimes desirable to reduce cost by sacrificing some valuable functions and/or performance. The operating system of the computer 1 can be one of several UNIX or Windows variants. The computer may be configured with different capacity, including but not limited to different amounts of CPU, RAM, and/or storage. Implementation with multiple computers, storage systems, disk subsystems, and/or connections can be implemented. Such implementation not only improves performance and capacity, but also minimizes weak points in a mass recovery operation.

Alternatively, in order to reduce cost, a single computer can serve as a Replication Machine, in which internal storage devices can serve as a storage system 3 and as a disk subsystem 2. For instance, one may choose a Sun Microsystems model E450 computer as a Replication Machine without attaching other external devices. Since an E450 can be equipped with up to about twenty internal disks, it can perform OS disk replication for over a dozen different computers at the same time.

An effective data replication can be used to prevent data loss in case of a disaster. There are a number of free or low-cost data transferring, migration, copying and backup utilities available to enable data replication over the TCP/IP network and/or Internet. However, these techniques often result in data loss. On the other hand, a storage area network (or "SAN") provides extended distance between a computer and its external storage. Such an extended distance allows more effective data replication implemented with OS-based data mirroring and other data replication utilities. To minimize possible data loss, high-end storage systems can be implemented for instant data replication to a remote backup data center location.

A. Operation

The present invention can be used to reproduce a computer system (target computer) with identical functions from a backup image of the original system (existing computer). A necessary process of computer system recovery is to replicate the operating system disk since it contains the complete system information, including its unique identification, system configuration files and other system data and parameters. The recovery process is generally accomplished by copying the previously saved OS disk image to a new OS disk for a new (target) computer. OS images can be saved in advance on the storage system 3 of the Replication Machine 8. On the Replication Machine 8, OS images are available on the storage system 3 as data sources, and appear in the same manner to the operator even though the actual hardware configuration of the Replication Machines may be significantly different, such as shown in FIGS. 2-4, inclusive. As a result, the manner of operation of the present invention is independent from the actual hardware configuration of the Replication Machines.

A native UNIX backup and recovery utility named "dd" is illustrated herein to replicate OS disks as an example. A major advantage of "dd" is that it can make a data image of one device onto another at high speed. The entire OS file contents, the disk configuration information, the boot loader containing boot program, and the boot information can all be copied with one "dd" command. "dd" is widely available through standard distribution of many UNIX variations without extra cost. A Windows version of the "dd" utility is available from MKS Inc™. The utility works basically in the same manner on most of these operating systems. The product manual that comes with the computer or software package provides detailed instructions on how to use "dd".

If the (target) system hardware configuration to be replicated is exactly the same as that of the (existing) original one, having an identical disk replicated should be sufficient for the replicated system to be operational. An example is the scenario where the OS software is erased in a hacker attack. In such a case, "dd" is a preferred method for OS disk replication. The original OS disk image by "dd" can be saved in advance on the storage system 3. In a disk replication operation, "dd" requires that the saved OS image be specified, from which the data copy is made, and that the replicated disk be identified by its device file name. A parameter called "block size" also needs to be specified, and a value between 65536 and 4194304 is usually sufficient for satisfactory performance. In the illustrations here, the disk replication operation is carried out by executing the "dd" command on the Replication Machine with the replicated disk in its disk subsystem 2 as shown in step 110 of FIG. 1. After disk replication is made, the replicated disk is then moved into the target computer for replacement in the exact location of the original (existing) computer as shown in step 140 of FIG. 1, and the computer system replication process is thus completed as shown in step 190 of FIG. 1. This entire procedure has been tested successfully on both the Sun Microsystems E250 and 220R computers and the Hewlett-Packard L2000 computer.

The system disk image is generally hardware dependent since it records all device identifiers to match the original (existing) system. Even a replacement (target) system is the same model computer as the original (existing computer), a replicated system disk can run into problems. For example, a Sun Microsystems Model 280R computer may be equipped with up to two CPUs, two internal disks, and four PCI cards. As a result, multiple hardware configurations can be arranged with different numbers of CPUs, disks, or PCI cards in different position for Sun Microsystems 280R systems. Such a difference may prevent a new computer from starting up with a disk that is exactly replicated from another existing 280R.

Computers from Sun Microsystems are chosen to illustrate how to use this invention. The existing original computer is a 280R computer equipped with a single CPU and one internal disk. The target replacement hardware is a 280R equipped with two CPUs and two internal disks of the same type, and additional PCI networking interface card.

With an OS backup image of the original 280R on the storage system 3, a replicated OS disk is made on an internal disk of the Replication Machine with the procedures described in the Section above, corresponding to step 110 in FIG. 1. The replicated OS disk is then moved into the target (replacement) computer in the same slot as the existing (original) computer, corresponding to step 140 in FIG. 1. However, the replacement 280R (target computer 10) cannot start up from the replicated OS disk 11' as shown in FIG. 2, as shown in step 150 in FIG. 1, because the replicated OS image is encoded with the original 280R hardware configuration. In this illustration, the OS disk of the original 280R has a world-wide unique identifier that encodes into the original OS image. As a result, all relevant system files and data of the replicated OS disk must be modified to adapt to the target replacement 280R. These system file modifications are needed to reflect the actual change in hardware configuration. These include the /etc/path_to_inst file and those files in /devices and /dev directory trees on the replicated disk. These files include all device drivers and configuration data that allow the computer to properly manage its hardware components.

The valid system configuration files are available on the target computer of replacement 280R when it starts from Solaris OS installation CD as shown in step 160 in FIG. 1. To modify these relevant system files and data on the replicated disk 11' to adapt to new replacement 280R hardware, on the replacement computer (target computer 10) started from a read-only Solaris CD, the valid path_to_inst file is located in /tmp/root/etc rather than the /etc directory. These files should be copied into the corresponding directories on the replicated disk. After the replicated OS disk 11' is modified to adapt to the replacement 280R (target computer 10), the target system is shall be able to start up from the modified OS environment with same system functions as the original (existing computer 9). Thus the system replication process is completed, as shown in step 190 in FIG. 1.

B. Alternative Methods

Disk replication can also be made by other data copying utilities and various data replication software. These include both device-level and file-level data copying utilities, as well as data replication and disk mirroring and/disk cloning software. The majority of OS data are held on OS file-systems. A file-system is a special type of data structure built on part of a disk. An OS disk must be specially prepared to have a valid disk structure that contains a boot loader and properly configured file-systems to hold OS data. All OS file-systems can be readily replicated by one of these techniques. To use file-level data copying utilities, the operating system of the Replication Machine is required to be the same as that of the computer to be reproduced.

Many UNIX operating systems provide their own version of "dump", "restore", "cpio", and "tar" utilities. They work generally the same with a few minor differences. The system administration manual of the operating system should be consulted for detailed information on how to use these utilities. Some UNIX platforms also provide "fbackup", "volcopy" and "pax" utilities. Many of these utilities are also commercially available for Windows operating systems from MKS Inc. "NTBACKUP" is a native backup utility from Microsoft Windows NT and 2000. All these techniques can be used to replicate OS file-systems.

With file-level data copying utilities, OS disk replication can be made with the following steps: (1) configure the OS disk and file-systems to be compatible with the originals, (2) install the boot loader containing boot program and information on the disk, and (3) restore the OS file-systems with a file-level backup utility. The followings are examples which illustrate OS disk replication with file-level backup utilities.

For Sun Microsystems' Solaris OS, the disk to be replicated can be configured by a Solaris utility named "format" on a Replication Machine running Solaris. The boot loader can then be installed by a utility named "installboot". All file-systems can be configured by a utility named "newfs" which is compatible with the original ones. Both dump and swap areas can be configured with utilities named "dumpadm" and "swap". After the OS disk and file-systems are properly configured, the OS file-systems can be built from all file-system images on the storage system 3. Solaris utilities named "ufsdump" and "ufsrestore" are Sun's version of the UNIX "dump" and "restore". The original OS file-systems can be saved in advance on the storage system 3 by "ufsdump" piped to "ufsrestore". At the time of replicating, all OS file-systems can be rebuilt by "ufsdump" piped to "ufsrestore" from the saved OS file-system images to the disk to be replicated on the Replication Machine. Thus a replicated OS disk is made. In most cases, the procedures described in Section (2) and (3) or equivalent should be followed to complete a system replication.

For Intel-based Linux computers, the disk to be replicated can be configured by a utility named "fdisk" on a Replication Machine running Linux. The boot loader can be installed by a utility named "lilo". All file-systems can be configured by a utility named "mke2fs" compatible with the original ones. Swap can be configured with utilities named "mkswap" and "swapon". After the OS disk and file-systems are properly configured, the OS file-systems can be built from all file-system images on the storage system 3. The original OS file-systems can be saved in advance on the storage system 3 by "dump" piped to "restore". At the time of replicating, all OS file-systems can be rebuilt by "dump" piped to "restore" from the saved OS file-system images to the disk to be replicated on the Replication Machine. After the replicated disk is moved back in exactly the same place of the original computer, the computer replication process is completed.

For FreeBSD computers, the disk to be replicated can be configured by utilities named "fdisk" and "disklabel" on a Replication Machine running FreeBSD. The boot loader can be installed by utilities named "boot0cfg" and "disklabel". All file-systems can be configured by a utility named "newfs" compatible to the original ones. Swap can be configured with a utility named "swapon". After OS disk and file-systems are properly configured, OS file-systems can be built from all file-system images on the storage system 3. The original OS file-systems can be saved in advance on the storage system 3 by "dump" piped to "restore". At the time of replicating, all OS file-systems can be rebuilt by "dump" piped to "restore" from the saved OS file-system images to the disk to be replicated on the Replication Machine. After the replicated disk is moved back in the exact same place as the original computer, the computer replication process is completed.

For Tru64 of COMPAQ, the disk to be replicated can be configured by a utility named "disklabel" on a Replication Machine running Tru64. The boot loader can be installed by utilities named "boot0cfg" and "disklabel". All file-systems can be configured by a utility named "newfs" for UFS type or "mkdmn" and "mkfset" utilities for AdvFS type. After OS disk and file-systems are properly configured, the OS file-systems can be built from all file-system images on the storage system 3. The original OS file-systems can be saved in advance on the storage system 3 by "dump" piped to "restore". At the time of replicating, all OS file-systems can be rebuilt by "dump" piped to "restore" from the saved OS file-system images to the disk to be replicated on the Replication Machine. After the replicated disk is moved back in the exact same place as the original computer, the computer replication process is completed.

For Hewlett-Packard's HP-UX with logical volume manager, the disk to be replicated can be configured by using "pvcreate", "mkboot", "mknode", "vgcreate", and "vgextend" utilities on a Replication Machine running HP-UX. All file-systems can be configured by utilities named "lvcreate" and "newfs" compatible to the original ones. Boot sector, dump and swap areas can be configured with a utility named "lvlnboot". After the OS disk and file-systems are properly configured, the OS file-systems can be built from all file-system images on the storage system 3. The original OS file-systems can be saved in advance on the storage system 3 by "vxdump" piped to "vxrestore". At the time of replicating, all OS file-systems can be rebuilt by "vxdump" piped to "vxrestore" from the saved OS file-system images to the disk to be replicated on the Replication Machine. After the replicated disk is moved back to the exact same place as the original computer, the computer replication process is completed.

Although this invention has been described with a certain degree of particularity, it is to be understood that the present disclosure is made by way of illustration, and that numerous changes in the details of construction and arrangements of parts, or in choice of commands and/or programs with similar functions, may be resorted to without departing from the spirit and scope of the invention. For example, without limitation, the computer OS may be other than variants of UNIX or Windows, as long as appropriate corresponding utilities are utilized. Besides "dd", various native UNIX data copy utilities, including "dump"/"restore", "cpio", and "tar", can also be used to replicate the OS device images on the Cloning Machine. Alternatively, logical volume software, such as Sun Volume Manager and Veritas Volume Manager, and storage system based data replication solutions can also be used to replicate the OS device images to the storage system 3 on the Replication Machine.

I claim:

1. A method of using a replication machine to replicate an existing computer into a target computer, wherein:
   the existing computer comprises an existing configuration and a working operating system disk image;
   the target computer comprises a target configuration;
   and there is a difference between the existing configuration and the target configuration;
   the method comprising:
   (a) providing computer processor means for processing data;
   (b) providing computer storage means for storing the operating system disk image corresponding to the existing computer, and a storage disk for storing an operating system disk image for the target computer;
   (c) replicating the entire operating system disk image corresponding to said existing computer into the target operating system disk image for said target computer on said storage disk, whereby said replicating of operating system disk image occurs on said replication machine that is not said existing computer nor said target computer;
   (d) connecting said storage disk from said replication machine to said target computer;
   (e) updating said replicated operating system disk to accommodate said difference;
   whereby said target computer will provide the same functions as said existing computer,
   whereby said replication machine is for use in one or more of the uses in the group consisting of computer disaster recovery, computer upgrade, computer testing, computer migration, and computer installation.

2. A method of using a replication machine to replicate an existing computer system comprising a plurality of existing computers into a target computer system comprising a plurality of target computers, wherein:
   each of the existing computers comprises an existing configuration and a working operating system disk image;
   each of the target computers comprises a target configuration;

the target computers are in a one-to-one correspondence with the existing computers;

and there is a difference between each of the existing configurations and the target configuration on the corresponding computers;

the method comprising:
- (a) providing computer processor means for processing data;
- (b) providing storage means for storing the operating system disk images for each of the existing computers, and storage disks for storing operating system disk images for each of the target computers;
- (c) replicating the entire operating system disk image corresponding to each of the existing computers into the target operating system disk image corresponding to each of the target computers on said storage disks, whereby said replicating of operating system disk images occurs on said replication machine that is not any of said existing computers nor any of said target computers;
- (d) connecting each of said storage disks from said replication machine to each of said corresponding target computers;
- (e) updating any of said replicated operating system disks to accommodate said corresponding difference;

whereby the plurality of said target computers will be produced by using said replication machine;

whereby each of said target computers will provide the same functions as said corresponding existing computer, whereby said replication machine is for use in one or more of the uses in the group consisting of computer disaster recovery, computer upgrade, computer testing, computer migration, and computer installation.

3. A replication machine for replicating an existing computer into a target computer, wherein:

the existing computer comprises an existing configuration and a working operating system disk image;

the target computer comprises a target configuration;

and there is a difference between the existing configuration and the target configuration;

the replication machine comprising:
- (a) computer processor means for processing data;
- (b) computer storage means for storing the operating system disk image for the existing computer, and a storage disk for storing an operating system disk image for the target computer;
- (c) replicating means for replicating the entire operating system disk image corresponding to said existing computer into the target operating system disk image for said target computer on said storage disk, whereby said replicating means provided by said replication machine that is not said existing computer nor said target computer;
- (d) connecting means for connecting said storage disk from said replication machine to said target computer;
- (e) updating means for updating said replicated operating system disk to accommodate said difference;

whereby said target computer will provide the same functions as said existing computer, whereby said replication machine is for use in one or more of the uses in the group consisting of computer disaster recovery, computer upgrade, computer testing, computer migration, and computer installation.

4. The replication machine as described in claim 3, further comprising simultaneous replicating means for replicating a plurality of operating system disk images corresponding to a plurality of existing computers into a plurality of target operating system disk images corresponding to a plurality of target computers, whereby each of said target computers will provide the same functions as said corresponding existing computer.

5. An apparatus comprising a plurality of replication machines for replicating a plurality of existing computers into a target computer system comprising a plurality of target computers, wherein:

each of the existing computers comprises an existing configuration and a working operating system disk image;

each of the target computers comprises a target configuration;

the target computers are in a one-to-one correspondence with the existing computers;

and there is a difference between each of the existing configurations and the target configuration on the corresponding computers;

each replication machine comprising:
- (a) computer processor means for processing data;
- (b) computer storage means for storing operating system disk images for the existing computers, and storage disks for storing operating system disk images for the target computers;
- (c) replicating means for replicating the entire operating system disk image corresponding to each of the existing computers into the target operating system disk image for the corresponding target computer on said corresponding storage disk, whereby said replicating means is provided by said replication machine that is not any of said existing computers nor any of said target computers;
- (d) connecting means for connecting each of said storage disks from said replication machine to said corresponding target computer;
- (e) updating means for updating any of said replicated operating system disks to accommodate said corresponding difference;

whereby each of said target computers will provide the same functions as said corresponding existing computer, whereby any of said replication machines is for use in one or more of the uses in the group consisting of computer disaster recovery, computer upgrade, computer testing, computer migration, and computer installation.

6. The apparatus as described in claim 5, wherein the replication machines are all located in one location.

7. The apparatus as described in claim 5, wherein the replication machines are located in a plurality of locations.

* * * * *